United States Patent
Blick et al.

(10) Patent No.: US 6,922,303 B2
(45) Date of Patent: Jul. 26, 2005

(54) REACTION MASS DUAL-STAGE ACTUATOR (DSA) AND SENSOR

(75) Inventors: Dan Blick, Moss Beach, CA (US); Seong-Woo Kang, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 258 days.

(21) Appl. No.: 10/139,917

(22) Filed: May 6, 2002

(65) Prior Publication Data

US 2003/0206366 A1 Nov. 6, 2003

(51) Int. Cl.[7] ............................................. G11B 5/596
(52) U.S. Cl. .............................. 360/77.03; 360/77.02; 360/78.05
(58) Field of Search ........................ 360/60, 69, 75, 360/77.01, 77.02, 77.03, 77.06, 77.08, 77.11, 78.01, 78.04, 78.05, 78.11, 78.12, 78.06, 78.09

(56) References Cited

U.S. PATENT DOCUMENTS

| | | | |
|---|---|---|---|
| 5,208,712 A | 5/1993 | Hatch et al. | |
| 5,268,805 A | 12/1993 | Pent et al. | |
| 5,535,074 A | 7/1996 | Leung | |
| 5,666,243 A | 9/1997 | Brent | |
| 5,801,899 A | 9/1998 | Genheimer | |
| 5,844,754 A | 12/1998 | Stefansky et al. | |
| 5,864,444 A | 1/1999 | Baker et al. | |
| 5,905,608 A | 5/1999 | Frees et al. | |
| 5,986,852 A | 11/1999 | Berg et al. | |
| 5,999,372 A | 12/1999 | Peterson et al. | |
| 6,088,192 A | 7/2000 | Riener et al. | |
| 6,088,194 A | 7/2000 | Imaino et al. | |
| 6,091,574 A | 7/2000 | Misso | |
| 6,157,522 A | 12/2000 | Murphy et al. | |
| 6,166,874 A | * 12/2000 | Kim ............................ 360/75 |
| 6,185,075 B1 | 2/2001 | Tsujino et al. | |
| 6,198,606 B1 | 3/2001 | Boutaghou et al. | |
| 6,201,668 B1 | 3/2001 | Murphy | |
| 6,205,005 B1 | 3/2001 | Heath | |
| 6,226,152 B1 | 5/2001 | Tanaka et al. | |
| 6,233,124 B1 | 5/2001 | Budde et al. | |
| 6,577,464 B2 | * 6/2003 | Nakagawa ................... 360/62 |
| 6,583,964 B1 | * 6/2003 | Huang et al. ............ 360/294.4 |

* cited by examiner

*Primary Examiner*—David Hudspeth
*Assistant Examiner*—Jason Olson
(74) *Attorney, Agent, or Firm*—Ben J. Yorks; Jeffrey P. Aiello; Irell & Manella LLP

(57) ABSTRACT

A hard disk drive that has a reaction mass and a transducer that can be used to move and/or sense the acceleration of an actuator arm of the drive. The transducer is coupled to a disk controller that can provide output signals which induce a movement of the reaction mass. Movement of the reaction mass will cause a responsive movement of a head(s) coupled to the actuator arm. The transducer can also provide input signals to the controller that correspond to an acceleration of the actuator arm. The acceleration signal can provide force feedback for a servo system of the drive.

9 Claims, 3 Drawing Sheets

REACTION MASS DUAL-STAGE ACTUATOR (DSA) AND SENSOR

BACKGROUND OF THE INVENTION

1. Field of the Invention

The subject matter disclosed generally relates to the field of hard disk drives.

2. Background Information

Hard disk drives contain a plurality of magnetic heads that are coupled to rotating disks. The heads write and read information by magnetizing and sensing the magnetic fields of the disk surfaces. There have been developed magnetic heads that have a write element for magnetizing the disks and a separate read element for sensing the magnetic fields of the disks. The read element is typically constructed from a magneto-resistive material. The magneto-resistive material has a resistance that varies with the magnetic fields of the disk. Heads with magneto-resistive read elements are commonly referred to as magneto-resistive (MR) heads.

Each head is attached to a flexure beam to create an subassembly commonly referred to as a head gimbal assembly ("HGA"). The HGA's are attached to an actuator arm that has a voice coil coupled to a magnet assembly. The voice coil and magnet assembly create a voice coil motor that can pivot the actuator arm and move the heads across the disks.

Information is typically stored within annular tracks that extend across each surface of a disk. The voice coil motor can move the heads to different track locations to access data stored onto the disk surfaces. Each track is typically divided into a plurality of adjacent sectors. Each sector may have one or more data fields. Each data field has a series of magnetic transitions that are decoded into binary data. The spacing between transitions define the bit density of the disk drive. It is generally desirable to provide a high bit density to increase the overall storage capacity of the drive.

The disk drive can be subjected to shock and vibration loads that cause undesirable movement of the heads. Most disk drives include an internal servo routine that compensates for such undesirable movement. A typical servo routine will utilize information from servo bits on a data track to determine a position error signal (PES). The PES is used to drive the voice coil motor and maintain the heads on the centerlines of the tracks.

The voice coil motor has a relatively slow reaction time between when the disk drive controller provides an output signal and when the head actually moves in response to the signal. This slow reaction time degrades the track following and seek settling times of the disk drive. The slow reaction time is particularly burdensome when the servo routine is attempting to compensate for high frequency vibration.

The servo routine must wait for the reading of servo bits on the data track to receive feedback information regarding the location of the head. For embedded servo disk drives the servo bits are placed at periodic intervals throughout a track. This means that there is not a continuous stream of servo data. Additionally, the servo bits only provide positional information. Positional information does not provide feedback on the actual vibration/shock forces applied to the actuator arm.

There have been proposals to integrate a piezoelectric element into the head gimbal assembly to improve the reaction time of head movement. Alternatively, there has been proposed integrating a MEMS into the head to also achieve fast reaction times. To date, these solutions are impractical for mass producing hard disk drives.

BRIEF SUMMARY OF THE INVENTION

An actuator arm assembly for a hard disk drive. The assembly includes a reaction mass and a transducer coupled to an actuator arm.

DETAILED DESCRIPTION

Disclosed is a hard disk drive that has a reaction mass and transducer that can be used to move and/or sense the acceleration of an actuator arm of the drive. The transducer is coupled to a disk controller that can provide output signals which induce a movement of the reaction mass. Movement of the reaction mass will cause a responsive movement of a head(s) coupled to the actuator arm. The transducer can also provide input signals to the controller that correspond to an acceleration of the actuator arm. The acceleration signal can provide force feedback for a servo system of the drive.

Figure 1:
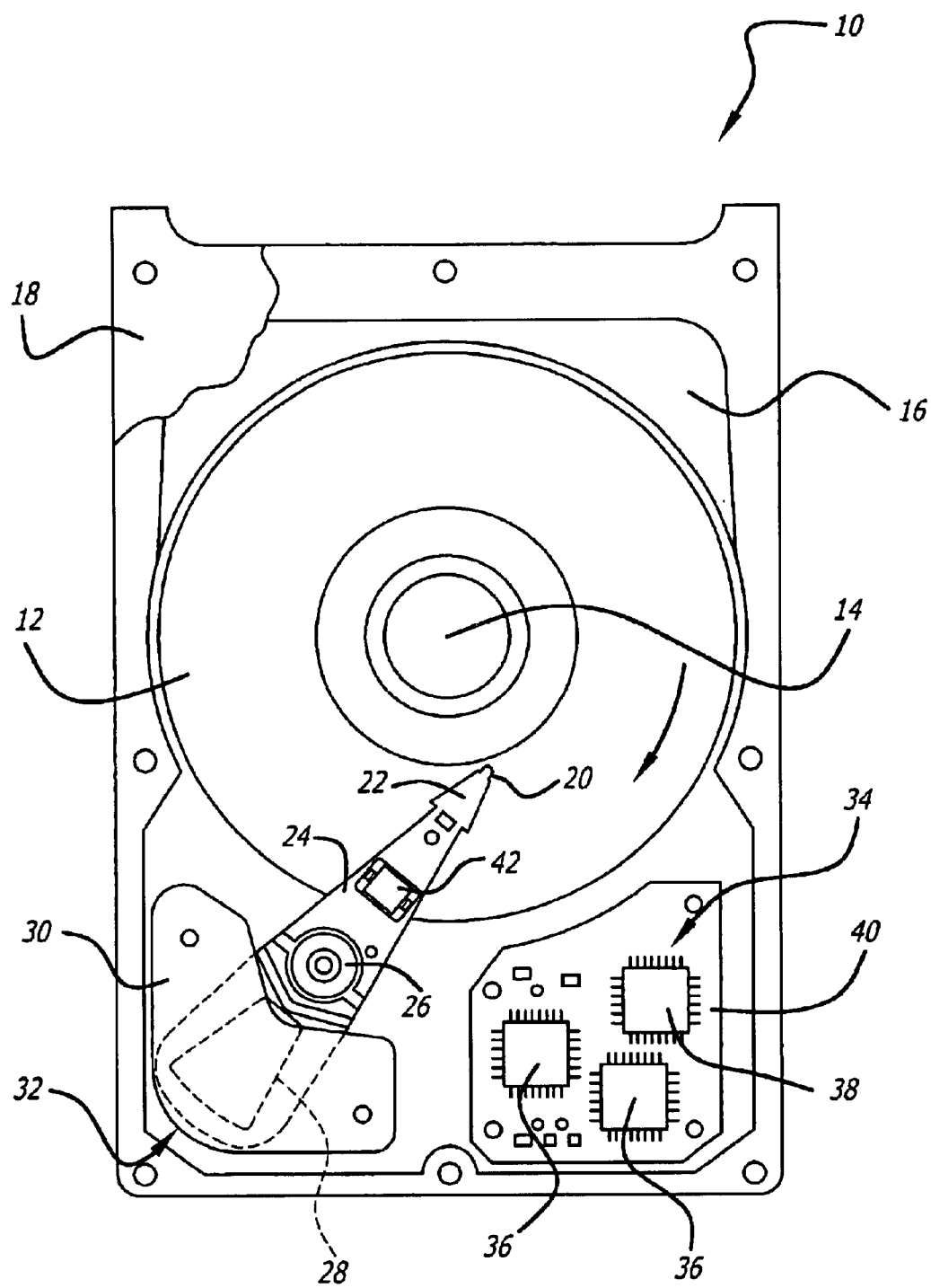
FIG. 1 is a top view of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown) that magnetize and sense the magnetic fields of the disks 12.

Each head 20 may be gimbal mounted to a flexure beam 22 as part of a head gimbal assembly (HGA). The flexure beams 22 are attached to an actuator arm 24 that is pivotally mounted to the base plate 16 by a bearing assembly 26. A voice coil 28 is attached to the actuator arm 24. The voice coil 28 is coupled to a magnet assembly 30 to create a voice coil motor (VCM) 32. Providing a current to the voice coil 28 will create a torque that swings the actuator arm 24 and moves the heads 20 across the disks 12.

Each head 20 has an air bearing surface (not shown) that cooperates with an air flow created by the rotating disks 12 to generate an air bearing. The air bearing separates the head 20 from the disk surface to minimize contact and wear. The formation of the air bearing and the general operation of the head 20 is a function of a force exerted by the flexure beam 22.

The hard disk drive 10 may include a printed circuit board assembly 34 that includes a plurality of integrated circuits 36 and 38 coupled to a printed circuit board 40. The printed circuit board 40 is coupled to the voice coil 28, heads 20 and spindle motor 14 by wires (not shown).

Integrated circuit 38 may be an electronic controller that can perform software/firmware routines. The software/firmware routines may include a servo subroutine to maintain the head 20 on the center of a disk track. The servo routine may include the processing of positional feedback information obtained by the head 20 from the disk 12 to generate a positional error signal (PES), The PES is used to drive the voice coil 28 and move the head 20.

Figure 4:
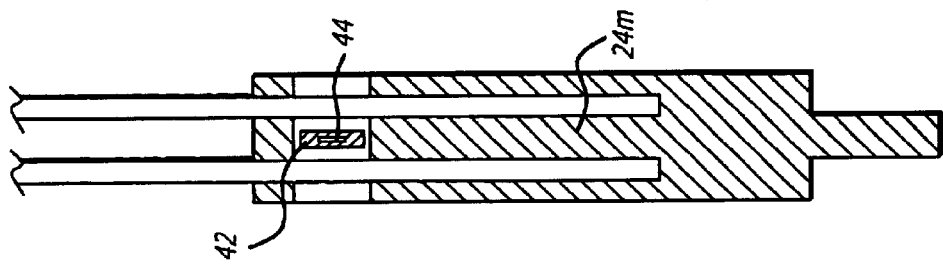
FIG. 4 is a side view of the actuator arm assembly.
Figure 3:
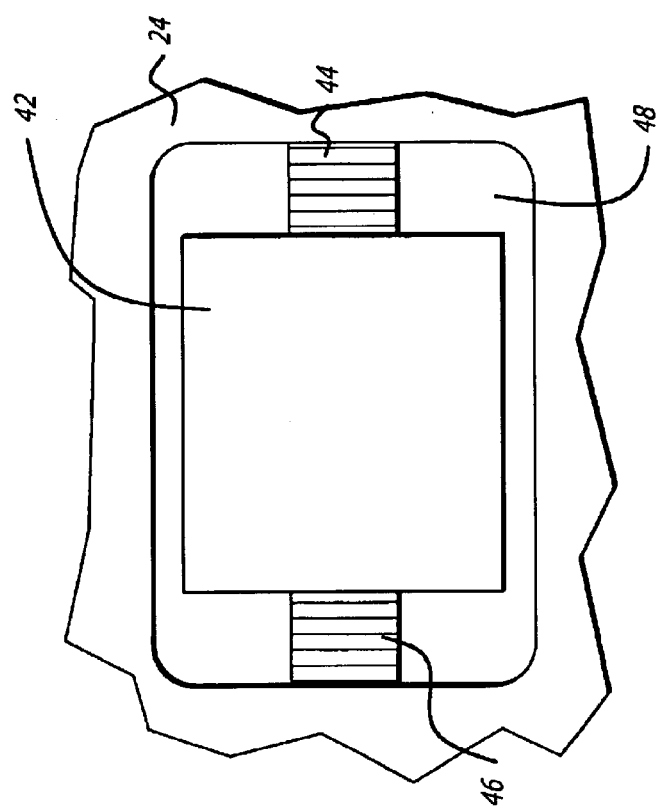
FIG. 3 is a top enlarged view of a reaction mass and transducer of the actuator arm assembly.
Figure 2:
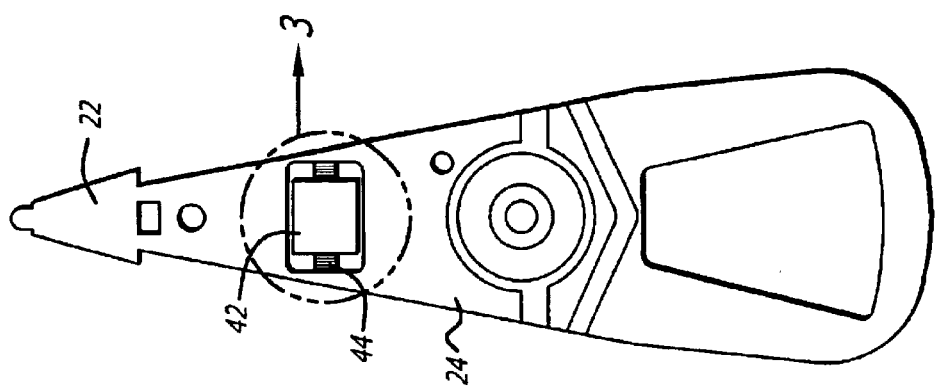
FIG. 2 is a top enlarged view of an actuator arm assembly of the hard disk drive.

As shown in FIGS. 2, 3 and 4, the disk drive 10 includes a reaction mass 42 that is coupled to the actuator arm 24 by a transducer 44. The transducer 44 may include a plurality of piezoelectric elements 46 attached to both ends of the mass 42. The transducer 44 is also connected to the printed circuit board assembly 34.

The transducer 44 can convert electrical energy into mechanical movement to move the reaction mass 42. The transducer 44 and reaction mass 42 are preferably located within a slot 48 of the actuator arm 24 to allow movement of the mass 42. The movement of the mass 42 will create a corresponding movement of the actuator arm 24 and the head 20. The movement of the arm 24 and head 20 will be in an opposite direction from movement of the reaction mass 42, it being understood that a movement of the mass 42 will create an equal and opposite force on the arm 24. As shown in FIG. 4, for an actuator arm 24 with multiple individual arms (sometimes referred to as an E-block), it is preferable to locate the transducer 44 and reaction mass 42 in the middle arm 24m to minimize torsional movement of the arm 24.

In operation, the controller 38 will generate an output signal to the transducer 44 to induce a desired movement of the reaction mass 42 and corresponding movement of the head 20. The controller 38 may also provide an output signal to the voice coil 28 to induce an arm movement in conjunction with movement of the mass 42. The output signal(s) may be in accordance with a servo routine that maintains the head 20 on the center of the disk track. The relatively small size of the mass 42 and transducer 44 provides a mechanism that can induce relatively fast movement of the head 20. This is particularly useful when compensating for high frequency vibration in the disk drive 10.

The transducer 44 converts mechanical motion into electrical energy. This allows the reaction mass 42 and transducer 44 to function as a force sensor to sense the acceleration of the actuator arm 24. For example, a transducer 44 with piezoelectric elements 46 will have an output voltage that varies with the amount of force and accompanying deflection of the elements 46. The variation in voltage can be processed to determine the acceleration and force of the actuator arm 22. This would allow the servo system to directly account for the force on the arm.

Figure 5:
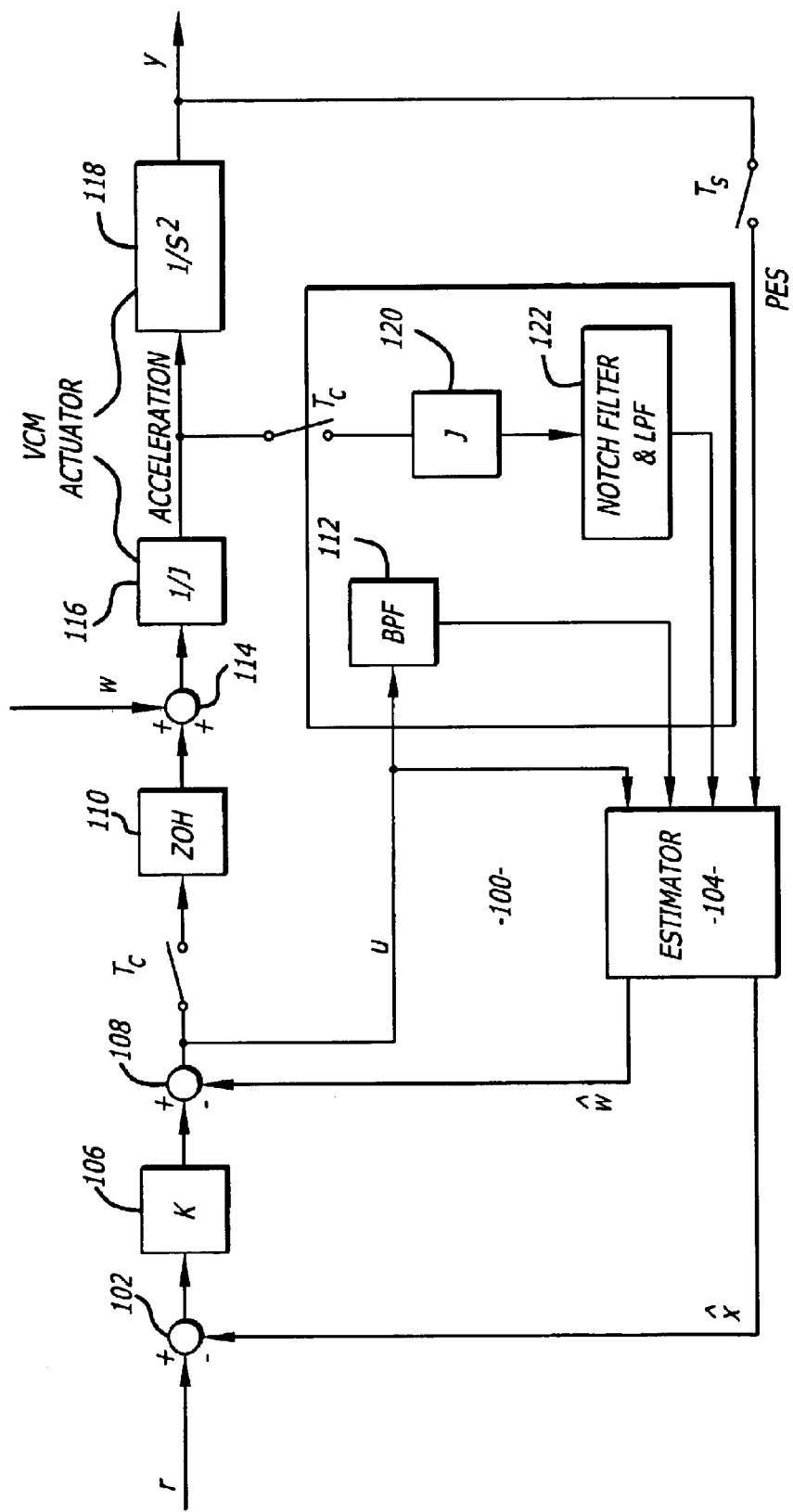
FIG. 5 is a schematic of a servo system for the hard disk drive.

FIG. 5 shows a servo system 100 that utilizes force feedback from mass 42 and transducer 44. The servo system 100 may include an initial position input for the head that is provided to a summing junction 102. The summing junction 102 sums a position output from an estimator 104 with the initial position input. The position value is scaled by a factor K in block 106.

Summing junction 108 subtracts an estimated force provided by the estimator 104 from the output of block 106. The output of summing junction 108 is provided to a digital to analog converter block 110. The summing junction output is also provided as an input to the estimator 104, in an unfiltered form, and after filtering by a band pass filter 112.

Summing junction 114 sums the output of block 112 and the a w measured by the reaction mass and transducer. The value w is processed from an acceleration signal provided by the transducer. The output of summing junction 114 is provided to the voice coil. The output of the voice coil is a function of the inertia block 116 and integrator 118. The voice coil output is also provided back to the estimator 104 as a position error signal (PES). The back emf of the coil is also sensed and provided to the estimator 104 through block 120 and filter 122. Filter 122 may include both notch and low pass filters.

The ability to sense the acceleration of the actuator arm allows the servo system to account for extraneous forces when controlling the position of the head through actuation of the voice coil.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a base plate;
   a spindle motor coupled to said base plate;
   a disk coupled to said spindle motor;
   an actuator arm mounted to said base plate;
   a voice coil motor coupled to said actuator arm;
   a flexure beam coupled to said actuator arm;
   a head coupled to said flexure beam and said disk, said head having a read element that can sense said disk to generate a position error signal;
   a reaction mass coupled to said actuator arm;
   a transducer coupled to said reaction mass and said actuator arm; and,
   a controller coupled to said head, said voice coil motor and said transducer, said controller receives an acceleration signal from said transducer and sums said acceleration signal with a first summed signal to create a second summed signal that is processed and sent to said voice coil motor, said first summed signal being a function of said position error signal.

2. The assembly of claim 1, wherein said transducer includes a piezoelectric element.

3. The assembly of claim 1, wherein said controller provides an output signal to said transducer.

4. The assembly of claim 1, wherein said first summed signal is a sum of an actual signal and a desired signal.

5. A hard disk drive, comprising:
   a base plate;
   a spindle motor coupled to said base plate;
   a disk coupled to said spindle motor;
   an actuator arm mounted to said base plate;
   a voice coil motor coupled to said actuator arm;
   a flexure beam coupled to said actuator arm;
   a head coupled to said flexure beam and said disk, said head having a read element that can sense said disk to generate a position error signal;
   sensor means for sensing an acceleration of said actuator arm;
   a controller coupled to said head, said voice coil motor and said sensing means, said controller receives an acceleration signal from said sensor means and sums said acceleration signal with a first summed signal to create a second summed signal that is processed and sent to said voice coil motor, said first summed signal being a function of said position error signal.

6. The hard disk drive of claim 5, wherein said sensor means includes a reaction mass and a transducer attached to said reaction mass and said actuator arm, said transducer being coupled to said controller.

7. The hard disk drive of claim 6, wherein said transducer includes a piezoelectric element.

8. The hard disk drive of claim 6, wherein said controller provides an output signal to said transducer.

9. A method for generating a signal for a voice coil motor, comprising;

generating a position error signal;

summing a desired signal with an actual signal to generate a first summed signal, the first summed signal being a function of the position error signal;

receiving an acceleration signal from a transducer that is coupled to an actuator arm and a reaction mass;

summing the first summed signal with the acceleration signal to create a second summed signal; and, transmitting a processed second summed signal to a voice coil motor.

* * * * *